S. G. RYDER.
REAMER.
APPLICATION FILED OCT. 27, 1908.

955,696. Patented Apr. 19, 1910.

Witnesses

Inventor

UNITED STATES PATENT OFFICE.

SUMNER G. RYDER, OF CLEVELAND, OHIO, ASSIGNOR TO THE STANDARD TOOL COMPANY, OF CLEVELAND, OHIO, A CORPORATION OF OHIO.

REAMER.

955,696.  Specification of Letters Patent.  Patented Apr. 19, 1910.

Application filed October 27, 1908. Serial No. 459,743.

*To all whom it may concern:*

Be it known that I, SUMNER G. RYDER, a citizen of the United States, and resident of Cleveland, in the county of Cuyahoga and State of Ohio, have invented certain new and useful Improvements in Reamers, of which I hereby declare the following to be a full, clear, and exact description, such as will enable others skilled in the art to which it appertains to make and use the same.

The objects of the invention are to provide a reaming tool having radial blades and also to provide means for minute radial and longitudinal adjustment of the blades, the adjusting means being so arranged as to positively secure each blade in the exact position required, so that no looseness of action is possible, or consequent chattering while in the work. To accomplish these objects the blades are set in longitudinal slots in a cylindrical holder and are provided each with a short V shaped groove on one radial face in which the angular edges of correspondingly shaped heads of the attaching screws inserted in the body are adapted to register. These screws are inserted in the body of the holder adjacent to and parallel with their respective blades and with their angular edges projecting into the V shaped grooves in the blades, so that the V shaped edges of the screw heads will always center themselves in the V shaped grooves. These grooves are relatively short in the longitudinal direction of the blades and form circular arcs hence the screw heads positively fix the adjustment of the blades both radially and longitudinally relative to the holder.

The invention comprises the construction and arrangement of the various parts as hereinafter described, shown in the accompanying drawings and specifically pointed out in the claims.

Figure 1:
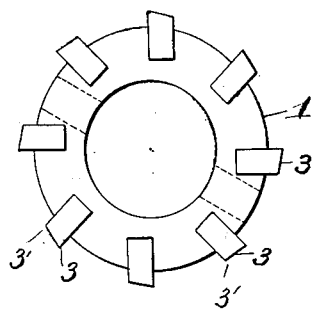
Figure 2:
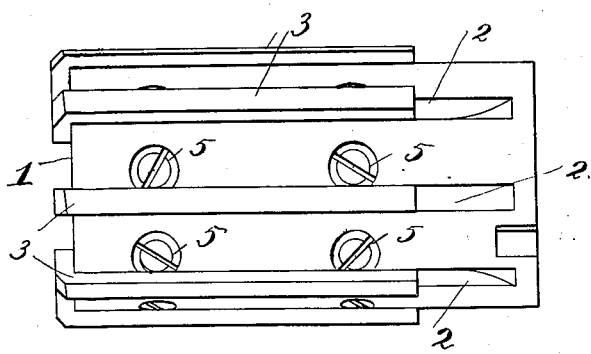
Figure 3:
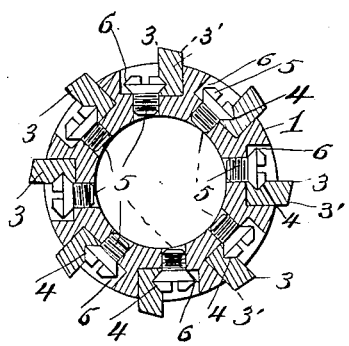
Figure 4:
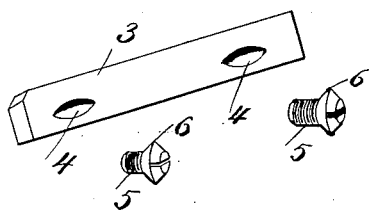
Figure 5:
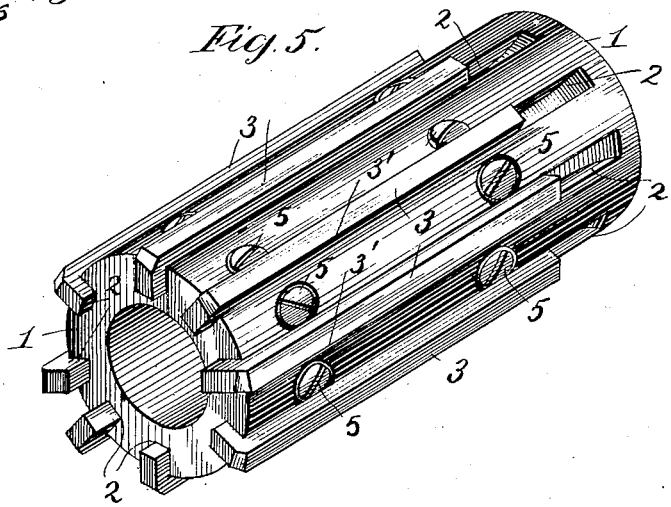

In the accompanying drawings, Figure 1 is an end view of the reamer; Fig. 2 is a side elevation thereof; Fig. 3 is a transverse section; Fig. 4 is a perspective view of one blade showing also the attaching and adjusting screws therefor; Fig. 5 is a perspective view of the complete device.

In these views 1 is the holder shown as a cylindrical shell provided with equally spaced longitudinal and radial slots 2, 2. In these slots are placed the cutting blades 3 having a slight clearance at 3 at the rear edge. The front faces of the blades are each provided with the grooves 4, 4 preferably two in number. Each groove is longitudinally milled out in a short arc of a circle, which is deepest in the middle and is of V shaped transverse section.

The attaching screws 5, 5, have heads with thin horizontal edges V shaped in cross section corresponding with the grooves just mentioned and the screws are inserted in the body of the holder in lines parallel with the blades and with the edges of the heads projecting far enough over the slots 2 to fit closely within grooves 4, 4.

It will be seen that when the screws are tightened the blades will be forced inwardly toward the bottoms of their respective slots, and when they reach the bottom the inclined faces of the screw heads force the blades tightly against the opposite side of their respective slots and since that side is the side against which the blade turns when in use no looseness sufficient to cause chattering can occur. Also by loosening the screws one at a time perfect control of the blades can be obtained and they can easily be moved outwardly by means of the agency of the screw heads for adjustment radially. The wedge shape of the grooves causes the angular heads to center themselves accurately therein and no chattering is possible.

To positively secure the blades after adjustment for increase in the diameter of the reamer, thin shims of any material can be placed in the bottom of each slot before adjustment, and the screws can tightly clamp the blades upon them.

Since the V shaped grooves in the blades are in the form of short arcs of circles of small diameter, the circular screw heads inserted in them will be longitudinally centered in them.

I believe myself to be the first to provide a cylindrical reamer body with series of radially adjustable blades and to make an adjustment therefor comprising screws parallel to the sides of the blades and provided with heads engaging and screwing the blades and serving to impart radial movement thereto.

Having described the invention what I claim as new and desire to secure by Letters Patent is:—

1. In a reamer provided with a longitudinally slotted body portion and cutting blades adapted to be inserted therein, the said blades having longitudinal V shaped grooves in their sides adjacent to their cutting edges, the combination therewith of screws adapted for insertion in said body portion and provided with laterally extended heads, having V shaped edges, adapted to engage the sides of said grooves in said blades.

2. In a reamer, the combination with the body portion provided with spaced longitudinal slots, of cutting blades adapted for insertion in said slots, and each blade provided with a radial face and a V shaped groove therein adjacent to its cutting edge and cut in the arc of a circle, and screws adjustably inserted in said body and provided with heads having V shaped edges adapted to engage said grooves, the said heads being instrumental in giving radial and longitudinal adjustment to said blades.

3. In a reamer, the combination with the body portion, provided with longitudinal slots, of blades adapted for insertion in said slots, said blades provided each at one radial side with a V shaped groove cut in the arc of a circle and screws adjustably secured in said body portion and provided with circular heads having angular edges corresponding to said V shaped grooves in said blades, and overhanging said slots so as to partially enter said V shaped grooves for radial and longitudinal adjustment of said blades.

In testimony whereof I hereunto set my hand this 29" day of August 1908.

SUMNER G. RYDER.

In presence of—
E. E. NORTHWAY,
WM. M. MONROE.